United States Patent
Wu et al.

(10) Patent No.: US 9,158,356 B2
(45) Date of Patent: Oct. 13, 2015

(54) ADAPTIVE VOLTAGE SCALING BASED ON THE RESULTS OF FORWARD ERROR CORRECTION PROCESSING

(75) Inventors: Yuejian Wu, Ottawa (CA); Sandy Thomson, Ottawa (CA); Han Henry Sun, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 13/170,747

(22) Filed: Jun. 28, 2011

(65) Prior Publication Data

US 2013/0007516 A1  Jan. 3, 2013

(51) Int. Cl.
  *G06F 11/00* (2006.01)
  *G06F 1/32* (2006.01)
  *G06F 11/07* (2006.01)
  *G06F 11/30* (2006.01)

(52) U.S. Cl.
  CPC ............ *G06F 1/3206* (2013.01); *G06F 1/3296* (2013.01); *G06F 11/076* (2013.01); *G06F 11/3024* (2013.01); *G06F 11/3055* (2013.01); *Y02B 60/1285* (2013.01)

(58) Field of Classification Search
  USPC .......................................................... 714/708
  See application file for complete search history.

(56) References Cited

U.S. PATENT DOCUMENTS

| 2010/0002506 | A1* | 1/2010 | Cho et al. .................. 365/185.03 |
| 2010/0110815 | A1* | 5/2010 | Lee et al. ....................... 365/211 |
| 2010/0218073 | A1* | 8/2010 | Kang et al. ...................... 714/764 |
| 2011/0075478 | A1* | 3/2011 | Yoon et al. ................ 365/185.03 |
| 2011/0182119 | A1* | 7/2011 | Strasser et al. ............ 365/185.03 |
| 2011/0219274 | A1* | 9/2011 | Cho et al. ........................ 714/708 |
| 2011/0258495 | A1* | 10/2011 | Tseng et al. .................. 714/704 |
| 2011/0289388 | A1* | 11/2011 | Nelson et al. .................. 714/773 |

OTHER PUBLICATIONS

Author: Kyung Suk (Dan) Oh, Senior Member, IEEE, Frank Lambrecht, Sam Chang, Qi Lin, Jihong Ren, Chuck Yuan, Jared Zerbe, and Vladimir Stojanovic; Title: Accurate System Voltage and Timing Margin Simulation in High-Speed I/O System Designs; Publisher: IEEE Transactions on Advanced Packaging, vol. 31, No. 4, Nov. 2008.*

D. Ernst, et al., "Razor: A Low-Power Pipeline Based on Circuit-Level Timing Speculation", Proc. Int. Symp. On Microarchitecture (MICRO-36), Dec. 2003; 12 pages.

(Continued)

*Primary Examiner* — Cynthia Britt
*Assistant Examiner* — Thien D Nguyen
(74) *Attorney, Agent, or Firm* — Harrity & Harrity LLP; David L. Soltz

(57) ABSTRACT

In one implementation, a device may include a voltage regulator circuit, a data processing circuit, and an error correction circuit, where the error correction circuit may correct errors in data processed by the data processing circuit to obtain error-corrected data and output an error-corrected version of the processed data. Additionally, an error monitor circuit may output an error signal indicative of a level of the errors in the processed data. A control circuit may receive the error signal and control the voltage regulator circuit to adjust, based on the error signal, the supply voltage to the data processing circuit. In some implementations, the control circuit may also base its decision to control the voltage regulator circuit based on available timing margins in the data processing circuit.

17 Claims, 6 Drawing Sheets

(56) References Cited

OTHER PUBLICATIONS

S. Das, et al., "Razor II: In Situ Error Detection and Correction for PCT and SER Tolerance", IEEE J. Solid-State Circuits, vol. 44, No. 1, Jan. 2009, pp. 32-48 (ARM).

D. Ernst, et al., "Razor: Circuit-Level Correction of Timing Errors for Low-Power Operation", IEEE Computer Society, Micro Top Picks, Nov.-Dec. 2004, pp. 10-20.

D. Blaauw et al., "CPU, Heal Thy Self", IEEE Spectrum, Aug. 2009, pp. 41-43, and 52-55.

K. A. Bowman et al., "Energy-efficient and metastability-immune timing-error detection and recovery circuits for dynamic variation tolerance", Conference on integrated Crcuit Design and Technology and Tutorial, 2008. ICICDT 2008. IEEE International, June, 2008, pp. 155-158.

* cited by examiner

ADAPTIVE VOLTAGE SCALING BASED ON THE RESULTS OF FORWARD ERROR CORRECTION PROCESSING

BACKGROUND

An important factor in the design of integrated circuits relates to the power dissipation and power usage of the integrated circuits. For System-on-Chip (SoC) designs, for instance, which may integrate all or substantially all components of a system (e.g., a computer or network device) into a single integrated circuit, it can be important to efficiently use power.

For hand-held devices such as cell phones, high power usage can quickly drain batteries. On the other hand, for central office equipment such as telecommunication network devices, high power usage can cause heat dissipation problems that may prevent the equipment from working properly. Accordingly, it may be desirable to reduce power consumption by a device, such as a SoC design.

One technique for reducing power consumption is to adjust the voltage supplied to the device. The voltage supplied to the device has a parabolic relationship to power dissipated by the device. The voltage may be adjusted based on, for example, timing margins (i.e., the "extra" time between the completion of an operation and the beginning of the next operation) within a data processing path of the device. One method is to adjust the supply voltage to maintain sufficient timing margin in the device. Another method is to allow the device to produce small amount of errors due to insufficient timing margin. These errors must be first detected in many modified circuit components such as flip-flops included in the device. Then, the operation that produces errors must be re-computed at a reduced clock rate. Many possible disadvantages of this technique may exist. One possible disadvantage is that the traditional design of circuit components may need to be modified to detect the available timing margins. This can add complexity and expense to the design. Another disadvantage of this technique is the requirement to re-compute the failed operation at a lower clock rate. This requirement is not always possible in practical applications.

SUMMARY

According to one aspect, a device may include a voltage regulator circuit to output a supply voltage. The device may further include a data processing circuit, coupled to the voltage regulator circuit, to receive data, process the data to obtain processed data, and output the processed data, where power for the data processing circuit is received from the regulator. The device may further include an error correction circuit, coupled to receive the processed data from the data processing circuit, to correct errors in the processed data to obtain error-corrected data, and to output, from the device, an error-corrected version of the processed data. The device may further include an error monitor circuit, coupled to the error correction circuit, to output an error signal indicative of a level of the errors in the processed data; and a control circuit to receive the error signal and to control the voltage regulator circuit to adjust, based on the error signal, the supply voltage.

According to another aspect, a method may include detecting errors, using a forward error correction technique, in data received from a data processing circuit and quantifying a level of the detected errors. The method may further include adjusting a voltage, used to power the data processing circuit, based on the quantified level of the detected errors; correcting the detected errors to obtain error-corrected data; and outputting the error-corrected data signal from the device.

According to another aspect, an integrated circuit may include a data processing circuit to receive input data signals, process the input data signals, and output the data signals as processed data signals; and an error correction circuit to receive the processed data signals. The error correction circuit may include: a forward error correction component to correct errors, in accordance with a forward error correction technique, in the processed data signals and to output error-corrected data signals, and a bit error rate monitor to output an error rate signal indicative of a level of errors corrected by the forward error correction component. A voltage regulator circuit may output a supply voltage to the data processing circuit. A control circuit may control a level of the supply voltage, output from the voltage regulator, based on the error rate signal.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers may be used in different drawings to identify the same or similar elements.

An implementation, described herein, may relate to adaptive voltage scaling for an integrated circuit (IC). The IC may include a data processing circuit that generates one or more output data streams and may be powered by a voltage that is supplied to the IC. The voltage may be reduced in order to lower power consumption. Although such reduced voltage may cause errors in the output data streams, the errors may be corrected with a forward error correction (FEC) circuit. Thus, the FEC circuit permits the data processing circuit to operate at a lower voltage.

In addition, the error rate that is observed by the FEC circuit may be monitored and used to adaptively scale the voltage supplied to the data processing circuit. For example, if the error rate is below an acceptable level, the voltage, supplied to the data processing circuit, may be decreased, but if the error rate rises above the acceptable level, the voltage, supplied to the data processing circuit, may be increased. Advantageously, voltage scaling may be used to scale the supply voltage, applied to the data processing circuit, to a minimum level that may potentially be optimal for power savings while allowing for occasional timing failures in the data processing circuit. Instead of detecting the timing errors and re-computing failed operations, the FEC circuitry may correct the errors in the same manner as if the errors were caused by transmission noise and/or dispersion effects.

Figure 1:
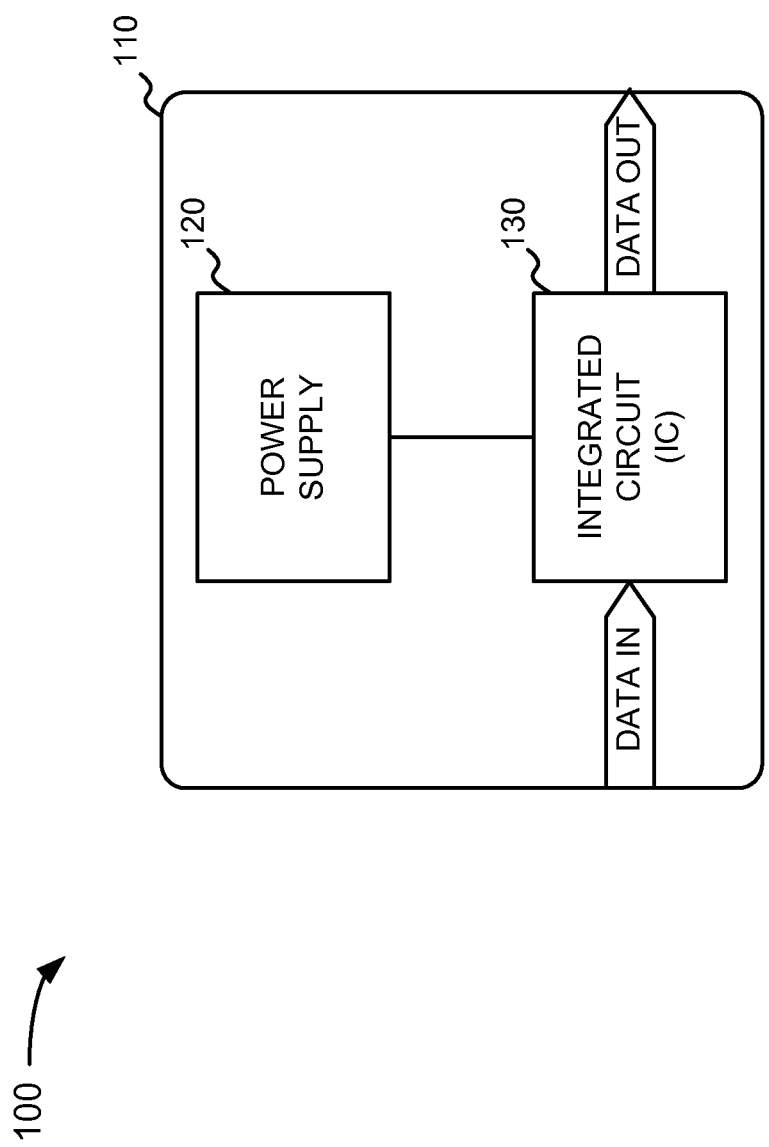
FIG. 1 is a diagram illustrating a system in which systems and/or methods described herein may be implemented.

FIG. 1 is a diagram illustrating a system 100 in which systems and/or methods described herein may be implemented. System 100 may include a device 110. Device 110 may include a power supply 120 and an integrated circuit (IC) 130.

Device 110 may broadly correspond to an electronic device, such as a consumer electronic device, a telecommunication network device, or another type of electronic device. Device 110 may receive data (DATA IN), process the data, and output the data (DATA OUT). The data may correspond to one or more signals. For example, in the context of a network device, such as a router or switch, each of the signals may correspond to a stream of digital data (e.g., a packet stream), which device 110 may process and output.

Power supply 120 may provide power to one or more components of device 110. Power supply 120 may be implemented using a number of different possible technologies, such as a battery, a linear regulated power supply, a switched-mode power supply, or another type of power supply.

IC 130 may be an integrated circuit that includes a number of functional components. The functional components may implement a System-on-Chip design. In one implementation, IC 130 may include an IC designed to synchronously process constant rate streams of data. For example, IC 130 may be a component of a router, switch, or another telecommunication or network device that processes and outputs data. As described in more detail below, IC 130 may use FEC techniques to remove errors in the data streams.

Although FIG. 1 shows example components of system 100, in other implementations, system 100 may contain fewer components, different components, differently arranged components, and/or additional components than those depicted in FIG. 1. Alternatively, or additionally, one or more components of system 100 may perform one or more tasks described as being performed by one or more other components of system 100.

Figure 2:
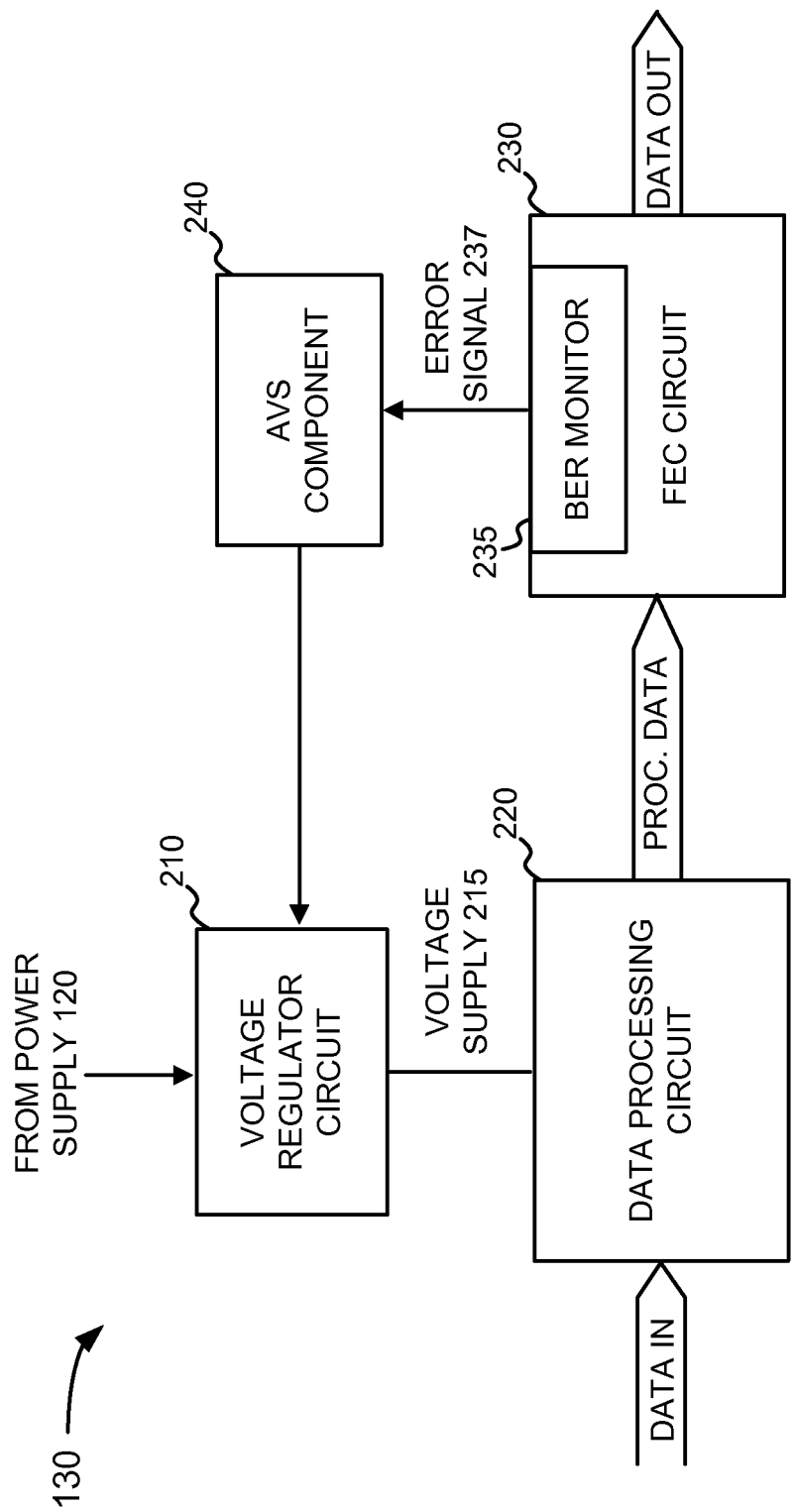
FIG. 2 is a diagram illustrating an example of an integrated circuit (IC) in additional detail.

FIG. 2 is a diagram illustrating an example of IC 130 in additional detail. As shown, IC 130 may include a voltage regulator circuit 210, a data processing circuit 220, a FEC circuit 230, and an adaptive voltage scaling (AVS) component 240.

Voltage regulator circuit 210 may include a circuit that receives power from power supply 120 and supplies a regulated version of the power, labeled as voltage supply 215, to one or more other elements of IC 130, such as data processing circuit 220. Voltage regulator circuit 210 may be of a feed-forward design or include negative feedback control loops to supply a steady voltage level to data processing circuit 220. The particular voltage level that is supplied by voltage regulator circuit 210 may be controllable. For example, based on an external signal (such as one from AVS component 240), voltage regulator circuit 210 may supply one of a number of possible per-determined voltage levels or may be controllable in an analog manner, such as to supply an output voltage proportional to a control signal.

Data processing circuit 220 may include a circuit that processes data (DATA IN) and outputs a processed version of the data (PROC. DATA). For example, in one implementation, data processing circuit 220 may include a digital signal processor (DSP), a packet processing circuit, or another type of data processor. Data processing circuit 220 may operate synchronously with respect to a clock signal. In some situations, data processing circuit 220 may be configured to maintain a constant or a minimum data throughput rate.

In another implementation, data processing circuit 220 may implement a digital or analog filter, such as a finite impulse response (FIR) filter.

In some implementations, the clock signal for data processing circuit 220 may be of a variable frequency. For instance, during periods of high load or high data throughput, data processing circuit 220 may be controlled to operate at a higher clock frequency. Operating at a higher clock frequency may require a higher voltage input level from voltage regulator circuit 210.

FEC circuit 230 may include a circuit that receives the processed data stream that is output from data processing circuit 220. FEC circuit 230 may perform one or more forward error correction techniques on the processed data stream to correct errors in the data stream. In general, FEC is a known system of error control for data transmission in which redundant data is added, by an entity, such as data processing circuit 220 or an entity prior to data processing circuit 220, to the data. The redundancy may allow FEC circuit 230 to detect and correct a limited number of errors in the data without needing to request additional data.

FEC circuit 230 may additionally include a bit-error-rate (BER) monitor component 235. BER monitor component 235 may quantify the amount or rate of the errors corrected and/or detected by FEC circuit 230. As mentioned, during FEC, a limited number of errors may be corrected before the errors "overwhelm" the data redundancy in the FEC technique. Accordingly, it may be desirable to keep the corrected errors to a level below a maximum number that can be corrected by FEC circuit 230. BER monitor component 235 may output error signal 237, which may be indicative of the level or amount of errors in the data. In one implementation, error signal 237 may be indicative of a value indicating a quantity of errors per predetermined quantity of bits. For example, an error signal value of $10^{-7}$ may indicate the occurrence of approximately one error per 10 million bits. Alternatively, error signal 237 may indicate a rate of errors, such as the number of errors per unit time interval.

AVS component 240 may include a circuit that controls voltage regulator circuit 210, based on error signal 237, to adaptively vary the level of voltage supply 215. Reducing the voltage supplied to data processing circuit 220 may cause additional errors to be present in the output of data processing circuit 220. FEC circuit 230 may, however, operate to correct the errors so that the output data is error-free. In general, AVS component 240 may operate to scale the voltage supplied to data processing circuit 220 to a minimum level (or to within a certain margin of the minimum level) at which the errors received by FEC circuit 230 are still correctable. In this manner, the data output from FEC circuit 230 may be error-free while the power used by data processing circuit 220 may be minimized, e.g., less power may be supplied to data processing circuit 220.

FEC circuit 230 may be designed for a worst case scenario in which the normal error rate experienced by FEC circuit 230 may be below the error correcting capacity of FEC circuit 230. By monitoring error signal 237, AVS component 240 may be able to take advantage of the extra error correcting capacity of FEC circuit 230 (also called the error margin herein) to increase the power efficiency of data processing circuit 220.

Figure 3:
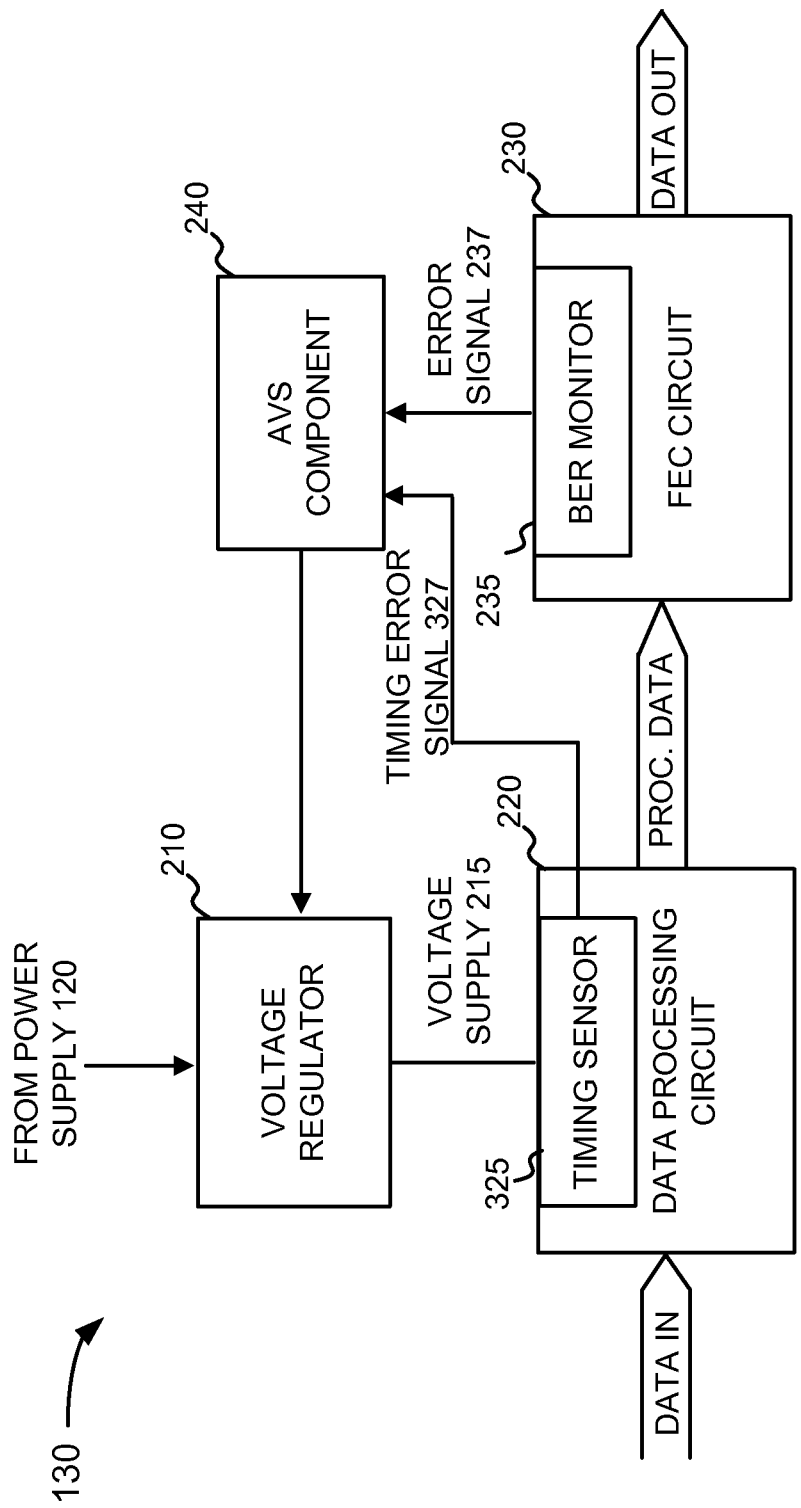
FIG. 3 is a diagram illustrating a second example implementation of an IC.

FIG. 3 is a diagram illustrating a second example implementation of IC 130. IC 130, as shown in FIG. 3, may be similar to IC 130, as shown in FIG. 2. In FIG. 3, however, a timing sensor 325 is illustrated as being included within data processing circuit 220.

Timing sensor 325 may include one or more sensors to detect timing margins in data processing circuit 220. The timing margin for a circuit may refer to, for a synchronous circuit, the difference between the time it takes a circuit to perform the functions, designed for the circuit in a single clock period, and the clock period. Thus, an operation with a high timing margin value may have "extra" time left over between the completion of a synchronous operation and the start of the next operation. An operation with little or no timing margin may have no or little extra time between the completion of a synchronous operation and the start of the next operation. A circuit with a negative timing margin may result in an error.

Timing sensor 325 may be implemented as, for example, additional logic associated with flip-flops in data processing circuit 220. Timing sensor 325 may generate one or more signals, shown as timing error signal 327, that may be indicative of the timing margin available in data processing circuit 220.

In general, for a given timing margin, higher frequencies of operation of data processing circuit 220 require additional power. Similarly, for a given operation frequency, lower input power may reduce the available timing margin of data processing circuit 220.

AVS component 240, in addition to using error signal 237 when making a decision to adjust the voltage to data processing circuit 220, may also use timing error signal 327. For example, AVS component 240 may reduce the voltage level to data processing circuit 220 when there is sufficient timing margin in data processing circuit 220, as indicated by timing error signal 327, and when error signal 237 indicates that there is sufficient error correction margin in FEC circuit 230.

Although FIGS. 2 and 3 show example components of IC 130, in other implementations, IC 130 may contain fewer components, different components, differently arranged components, and/or additional components than those depicted in FIGS. 2 and 3. Alternatively, or additionally, one or more components of IC 130 may perform one or more tasks described as being performed by one or more other components of system IC 130. For example, IC 130 may be implemented as multiple integrated circuits in which, for example, voltage regulator circuit 210 and AVS component 240 are in one IC and data processing circuit 220 and FEC circuit 230 are in a second IC.

Figure 4:
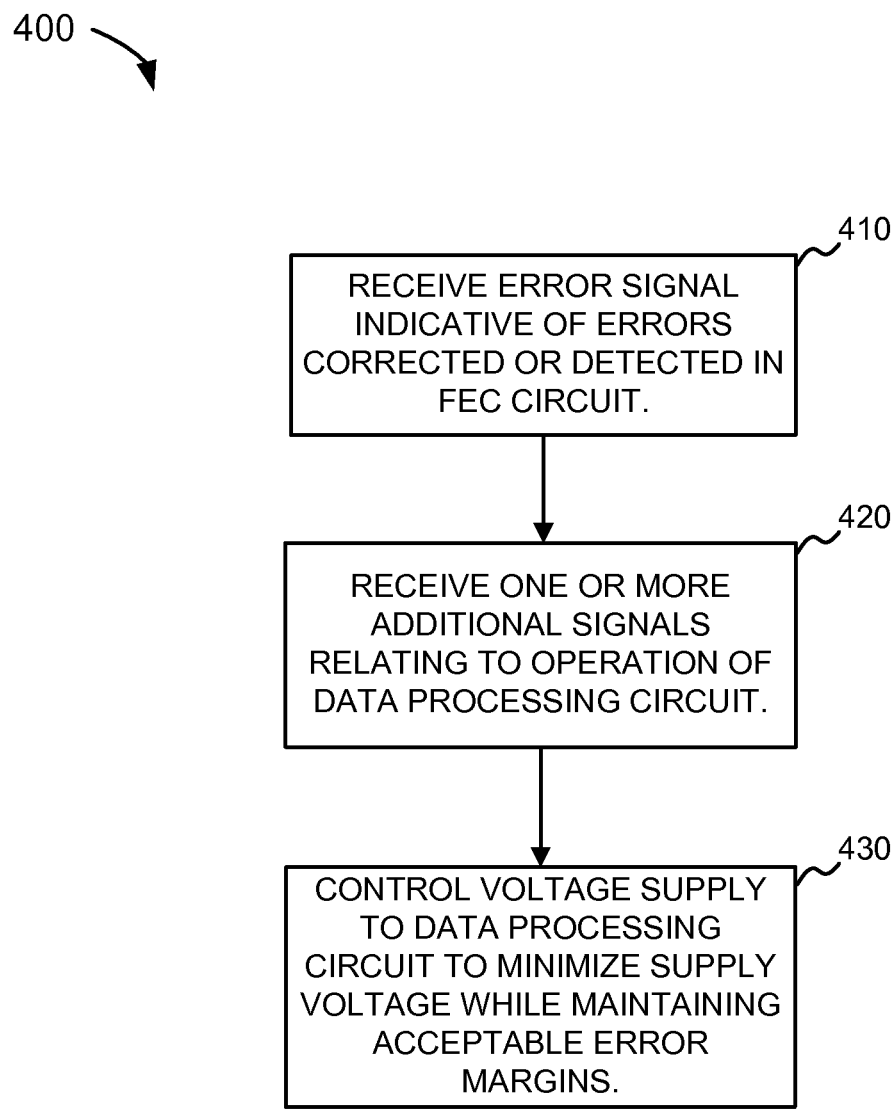
FIG. 4 is a flow chart illustrating an example process for adaptively adjusting the voltage supplied to a data processing circuit.

FIG. 4 is a flow chart illustrating an example process 400 for adaptively adjusting the voltage supplied to data processing circuit 220. Process 400 may be performed by, for example, IC 130, as illustrated in FIG. 2 or FIG. 3.

Process 400 may include receiving an error signal indicative of a level of errors that has been detected and/or corrected by FEC circuitry, such as FEC circuit 230 (block 410). The error signal may include error signal 237, as generated by BER monitor component 235. As previously mentioned, in one implementation, error signal 237 may be indicative of a quantity of bit errors for a predetermined quantity of bits.

Process 400 may further include receiving additional signals relating to the operation of data processing circuit 220 (block 420). In one implementation, the additional signals may include timing error signal 327, which may be indicative of timing margin available in the synchronous operation of data processing circuit 220. Other signals relating to the operation of data processing circuit 220, such as a signal relating to the operating temperature of data processing circuit 220, may alternatively or additionally be received. In some implementations, such as the implementation shown in FIG. 2, only the error signal indicative of errors corrected in FEC circuit 230 may be received. In this situation, block 420 may be omitted.

Process 400 may further include controlling the voltage supplied to data processing circuit 220 to minimize the applied supply voltage while maintaining acceptable error margins (block 430). The supplied voltage may be adaptively determined based on the signals received in blocks 410 and 420. For example, AVS component 240 may control voltage regulator circuit 210, to output voltage supply 215 at a level that is determined based on error signal 237 and, in some implementations, based on timing error signal 327. The "acceptable" error margin level may be chosen to be below an error rate that leads to errors that cannot be corrected by FEC circuit 220.

A number of different techniques or algorithms may be used to determine the level for voltage supply 215. For example, AVS component 240 may be configured (such as during manufacture of AVS component 240) to store a value that corresponds to a target acceptable error rate for FEC circuit 230, such as three bit errors per ten million ($3 \times 10^{-7}$) bits processed by FEC circuit 230. When error signal 237 is below this target rate, AVS component 240 may reduce the level of voltage supply 215. Reducing the level of voltage supply 215 may result in increased errors in the data streams received by FEC circuit 230, from data processing circuit 220. The additional errors may appear as "normal" errors caused by transmission noise and dispersion. When error signal 237 indicates an error rate greater than the target rate, AVS component 240 may increase the level of voltage supply 215. This may occur when, for example, errors, due to transmission noise, increase. In some implementations, voltage regulator circuit 210 and/or AVS component 240 may limit the possible voltage level range to a predetermined range (e.g., between one and three volts).

As another example of the operation of AVS component 240, assume that AVS component 240 additionally receives timing error signal 327, as shown in FIG. 3, which may be indicative of excess timing margin in data processing circuit 220. AVS component 240 may reduce the level of voltage supply 215 when both error signal 237 indicates an error rate below the target rate and timing error signal 327 indicates that additional timing margin is available in data processing circuit 220 (e.g., the components of data processing circuit 220 finish their individual operations with excess time before the end of a clock cycle). Otherwise, AVS component 240 may increase the level of voltage supply 215.

In some implementations, AVS component 240, in addition to controlling the voltage supplied to data processing circuit 220 based on error signal 237 and/or timing error signal 327, may control other parameters of data processing circuit 220, such as the input clock frequency for data processing circuit 220.

As discussed above, AVS component 240 may adaptively adjust the voltage to data processing circuit 220. In this manner, in a steady state condition, when a detected BER margin falls too low (e.g., below a predetermined threshold), AVS component 240 may raise the applied voltage to ensure an adequate BER margin. When the BER margin increases or the timing margin increases, which may suggest data processing circuit 220 is using too much power, AVS component 240 may scale down the supply voltage to maintain minimal power dissipation.

Data processing circuit 220 may be conceptually divided into a data path and a control path. The data path may include circuitry used to process the incoming data streams and the control path may be used to control the operation of the data path. For a data processing circuit 220 that filters incoming data streams, the data path may include the circuitry that filters the data streams and the control path may include the circuitry that controls parameters for the data path and/or monitor the data path. During voltage scaling, timing errors in the data path may be randomly scattered and uncorrelated. These errors can, thus, be considered as being equivalent to errors caused by data transmission noise and dispersions. In contrast, a timing error in the control path may cause a catastrophic error in the control path. Accordingly, it can be important, when performing voltage scaling, to ensure that timing errors, due to the voltage scaling, do not occur in the control path.

Figure 5:
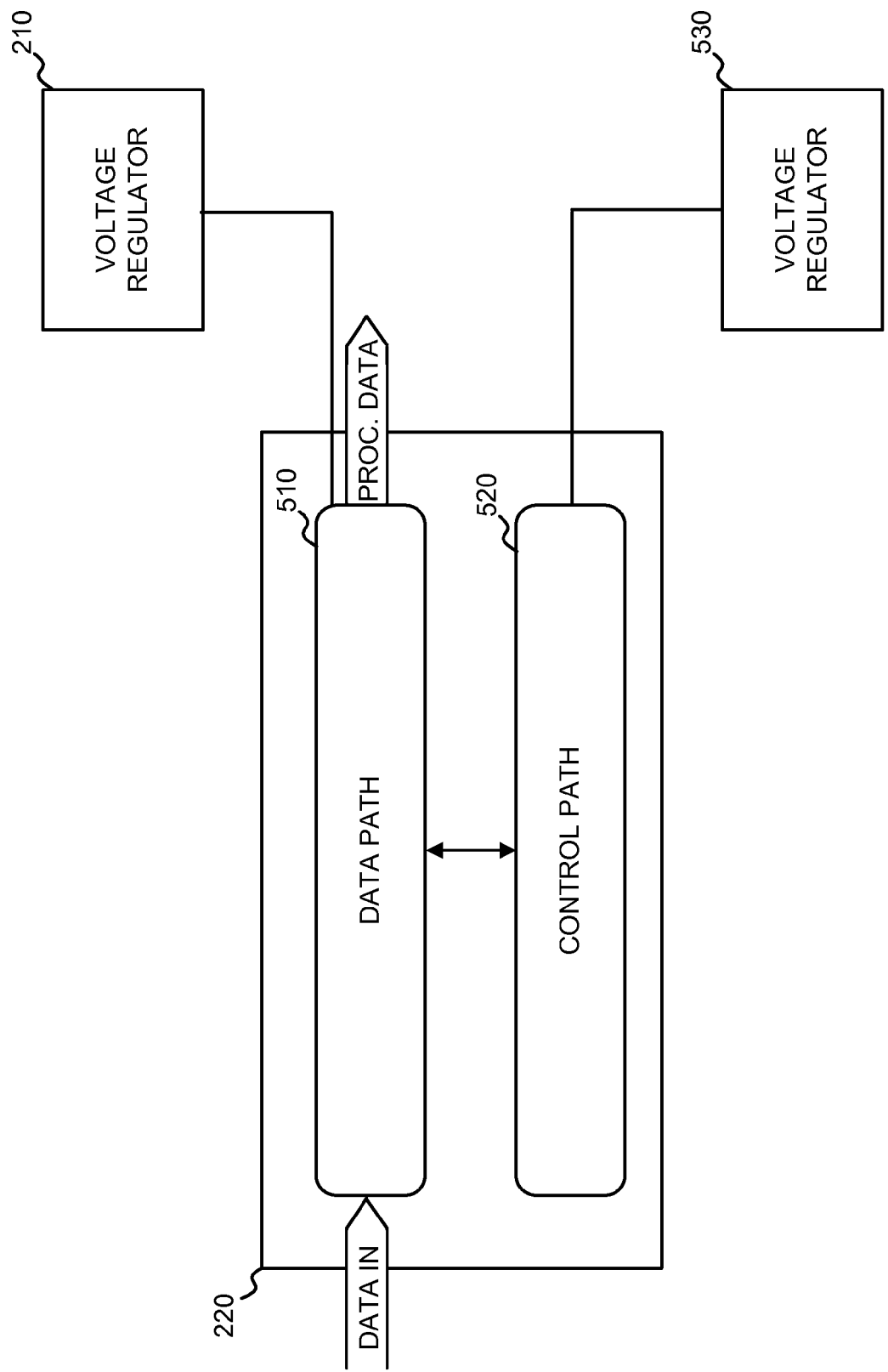
FIG. 5 is a diagram illustrating an example implementation of power islands to power a data processing circuit.

FIG. 5 is a diagram illustrating an example implementation of power islands to power data processing circuit 220. Power islands may refer to the use of separate power sources to power different circuits. In FIG. 5, data processing circuit 220 is illustrated as being divided into a data path portion 510 (hereinafter "data path 510") and a control path portion 520 (hereinafter "control path 520"). Data path 510 may process and modify the input data. Control path 520 may control the operation of data path 510. Data path 510 and control path 520 may generally represent a partitioning of data processing circuit 220 into the portion of data processing circuit that processes the data and the portion that controls such processing.

Voltage regulator circuit 210, which may be controlled by AVS component 240 (FIG. 2), may provide power to data path 510. A second voltage regulator, voltage regulator 530, may provide power to control path 520. Voltage regulator 530 may provide a fixed output voltage to control path 520. Thus, voltage regulators 210 and 530 provide separate power sources to data processing circuit 220. By separating the power supplied to data path 510 and control path 520, potential timing errors that may be caused by voltage scaling may be isolated to data path 510 and hence may not cause errors in control path 520.

Figure 6:
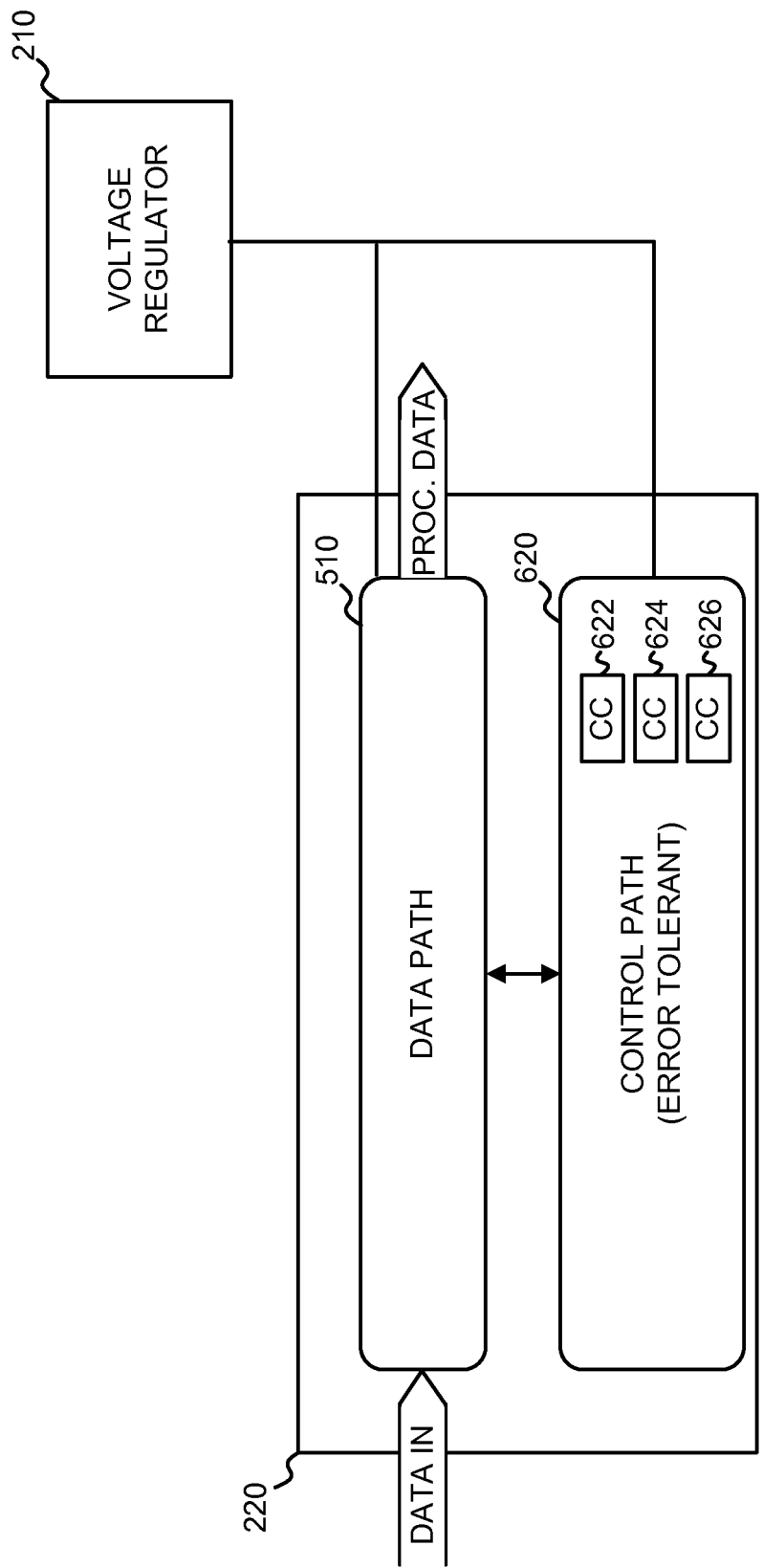
FIG. 6 is a diagram illustrating an example of the use of an error tolerant control path in a data processing circuit.

FIG. 6 is a diagram illustrating an example of the use of an error tolerant control path in data processing circuit 220. In FIG. 6, data processing circuit 220 is illustrated as being divided into data path 510 and a control path portion 620 (hereinafter "control path 620"). Control path 620 may control the operation of data path 510. Both data path 510 and control path 620 may receive power from voltage regulator circuit 210, which may be controlled by AVS component 240.

Control path 620 may be implemented to be error tolerant. For example, redundancy may be added to control circuitry such that control path 620 may be made tolerant to errors caused by voltage scaling. In one implementation, known error correction techniques, such as Hamming codes, may be used to introduce error tolerance to control path 620. In another implementation, a majority voting technique may be used in which multiple copies of portions of control path 620 are duplicated and the final output is based on majority voting of the copies. By using an error tolerant control path 620, potential timing errors that may be caused by voltage scaling may be suppressed to avoid catastrophic errors in control path 620. In FIG. 6, one redundant implementation of control path 620 is illustrated as including multiple copies of a control circuit (CC) 622, 624, and 626. The output of control circuits 622, 624, and 626 may be taken as an output in which a majority of control circuits 622, 624, and 626 include the same output value.

Although FIGS. 5 and 6 show example components relating to data processing circuit 220, in other implementations, data processing circuit 220 may contain fewer components, different components, differently arranged components, and/or additional components than those depicted. Alternatively, or additionally, one or more components may perform one or more tasks described as being performed by one or more other components.

The foregoing description provides illustration and description, but is not intended to be exhaustive or to limit the implementations to the precise form disclosed. Modifications and variations are possible in light of the above teachings or may be acquired from practice of the implementations.

For example, while a series of blocks has been described with regard to FIG. 4, the order of the blocks may be modified in other implementations. Further, the operations of certain blocks may be performed in parallel with other blocks.

Also, certain portions of the implementations have been described as a "component" that performs one or more functions. The term "component" may include hardware, such as a processor, an ASIC, or a FPGA, or a combination of hardware and software (e.g., software running on a general purpose processor). The term "hardware component," as used herein, may refer to a component that is implemented strictly in hardware, such as an ASIC or an FPGA.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
   a voltage regulator circuit to output a supply voltage;
   a data processing circuit, coupled to the voltage regulator circuit, to receive data, process the data to obtain processed data, and output the processed data, where power for the data processing circuit is received from the supply voltage;
   an error correction circuit, coupled to receive the processed data from the data processing circuit, to correct errors in the processed data based on the processed data to obtain error-corrected data, and to output, from the device, an error-corrected version of the processed data;

an error monitor circuit, coupled to the error correction circuit, to output an first signal indicative of a level of the errors in the processed data;
a timing sensor circuit that outputs a second signal indicative of a timing margin available in the data processing circuit, the timing margin being indicative of a difference between a time for the data processing circuit to perform a function in a clock period and the clock period; and
a control circuit to receive the first and second signals to control the voltage regulator circuit to adjust, based on the first and second signals, the supply voltage output by the voltage regulator circuit.

2. The device of claim 1, where the error correction circuit corrects the errors in the processed data in accordance with a forward error correction technique.

3. The device of claim 1, where the error signal, output from the error monitor circuit, indicates a quantity of bit errors over a time period or a quantity of bit errors relative to a quantity of bits in the processed data.

4. The device of claim 1, where the control circuit controls the voltage regulator circuit to lower the supply voltage when the level of errors is below a threshold.

5. The device of claim 1, where the control circuit controls the voltage regulator circuit to raise the supply voltage when the level of errors is above a threshold.

6. The device of claim 1, where the device includes a single integrated circuit chip.

7. A method, performed by a device, comprising:
detecting errors, using a forward error correction technique, in data received from a data processing circuit;
quantifying a level of the detected errors;
measuring timing margins in the data processing circuit, the timing margins being indicative of differences between respective times for the data processing circuit to perform a corresponding one of a plurality of functions in a clock period and the clock period;
adjusting a voltage, used to power the data processing circuit, based on the quantified level of the detected errors and the measured timing margins;
correcting the detected errors based on the received data to obtain error-corrected data; and
outputting the error corrected data from the device.

8. The method of claim 7, further comprising:
quantifying the level of the detected errors as a quantity of bit errors per unit time period or as a quantity of bit errors relative to a quantity of bits in the data.

9. The method of claim 7, where adjusting the voltage used to power the data processing circuit based on the quantified level of the detected errors and the measured timing margins further includes:
controlling a voltage regulator circuit to decrease a voltage level supplied to the data processing circuit when the quantified level of the detected errors is below a threshold.

10. The method of claim 9, where adjusting the voltage used to power the data processing circuit based on the quantified level of the detected errors and the measured timing margins further includes:
controlling the voltage regulator to increase the voltage level supplied to the data processing circuit when the quantified level of the detected errors is not below the threshold.

11. The method of claim 7, further comprising:
detecting errors for a plurality of data streams, where the plurality of data streams include the received data;
correcting the detected errors, for the plurality of data streams, to obtain a plurality of error-corrected data streams; and
outputting the error-corrected plurality of data streams from the device.

12. An integrated circuit comprising:
a data processing circuit to receive a plurality of input data signals, process the plurality of input data signals, and output the processed plurality of input data signals as a plurality of processed data signals;
an error correction circuit to receive the plurality of processed data signals, the error correction circuit including:
a forward error correction component to correct errors, in accordance with a forward error correction technique, in the plurality of processed data signals based on the plurality of processed data signals and to output a plurality of error-corrected data signals, and
a bit error rate monitor to output a first signal indicative of a level of errors corrected by the forward error correction component;
a timing sensor circuit that outputs a second signal indicative of a timing margin available in the data processing circuit, the timing margin being indicative of a difference between a time for the data processing circuit to perform a function in a clock period and the clock period;
a voltage regulator circuit to output a supply voltage to the data processing circuit;
a control circuit to control a level of the supply voltage, output from the voltage regulator circuit, based on the first and second signals; and
a plurality of output ports to output the plurality of error-corrected data signals from the integrated circuit.

13. The integrated circuit of claim 12, where the error rate signal indicates a quantity of bit errors over a time period or a quantity of bit errors relative to a quantity of bits in the plurality of processed data signals.

14. The integrated circuit of claim 12, where the control circuit controls the voltage regulator circuit to lower the supply voltage when the level of errors is below a threshold.

15. The integrated circuit of claim 12, where the control circuit controls the voltage regulator to raise the supply voltage when the level of errors is not below a threshold.

16. The integrated circuit of claim 12, where the control circuit additionally controls the voltage regulator circuit to adjust the supply voltage based on an operating temperature of the integrated circuit.

17. The integrated circuit of claim 12, where the integrated circuit has a System-on-Chip (SoC) design.

* * * * *